US007983970B1

(12) United States Patent
Ostler et al.

(10) Patent No.: US 7,983,970 B1
(45) Date of Patent: Jul. 19, 2011

(54) SECURE TELEWIRE PROCESS FOR AUTHORIZING WIRE TRANSFERS

(75) Inventors: Randall S. Ostler, Miami, FL (US); Geraldine Schnaider, Miami, FL (US); Alberto Ibarra, Miami, FL (US)

(73) Assignee: Intermex Wire Transfer, LLC, Miami, FL (US)

( * ) Notice: Subject to any disclaimer, the term of this patent is extended or adjusted under 35 U.S.C. 154(b) by 767 days.

(21) Appl. No.: 11/438,574

(22) Filed: May 22, 2006

(51) Int. Cl.
  *G06Q 40/00* (2006.01)
(52) U.S. Cl. .......................................................... 705/35
(58) Field of Classification Search ............... 705/35–42
  See application file for complete search history.

(56) References Cited

U.S. PATENT DOCUMENTS

| | | | | |
|---|---|---|---|---|
| 5,001,710 | A * | 3/1991 | Gawrys et al. ................ | 370/271 |
| 5,367,561 | A * | 11/1994 | Adler et al. ................. | 379/91.01 |
| 6,046,762 | A * | 4/2000 | Sonesh et al. ............... | 348/14.11 |
| 6,488,203 | B1 * | 12/2002 | Stoutenburg et al. ......... | 235/379 |
| 6,661,882 | B1 * | 12/2003 | Muir et al. ................ | 379/127.01 |
| 6,741,697 | B2 * | 5/2004 | Benson et al. ............. | 379/265.02 |
| 6,769,605 | B1 * | 8/2004 | Magness ........................ | 235/379 |
| 6,813,636 | B1 * | 11/2004 | Bean et al. .................... | 709/226 |
| 7,023,979 | B1 * | 4/2006 | Wu et al. .................. | 379/265.11 |
| 7,269,160 | B1 * | 9/2007 | Friedman et al. ............. | 370/352 |
| 7,356,505 | B2 * | 4/2008 | March ............................ | 705/39 |
| 7,720,754 | B1 * | 5/2010 | Gutierrez-Sheris ............. | 705/39 |
| 7,870,065 | B2 * | 1/2011 | Gutierrez-Sheris ............. | 705/39 |
| 2002/0029190 | A1 * | 3/2002 | Gutierrez-Sheris ............. | 705/39 |
| 2003/0069856 | A1 * | 4/2003 | Seifert et al. ................. | 705/73 |
| 2003/0195846 | A1 * | 10/2003 | Felger ............................. | 705/40 |
| 2004/0210518 | A1 * | 10/2004 | Tiem ............................... | 705/39 |
| 2004/0230527 | A1 * | 11/2004 | Hansen et al. ................... | 705/40 |
| 2004/0230610 | A1 * | 11/2004 | Gutierrez-Sheris ........ | 707/104.1 |
| 2006/0056385 | A1 * | 3/2006 | Fotta et al. ..................... | 370/351 |
| 2006/0116889 | A1 * | 6/2006 | Hasebe et al. ..................... | 705/1 |
| 2006/0163341 | A1 * | 7/2006 | Tulluri et al. ................. | 235/379 |
| 2006/0261150 | A1 * | 11/2006 | Seifert et al. .................. | 235/379 |
| 2007/0078763 | A1 * | 4/2007 | Babi et al. ........................ | 705/39 |
| 2007/0124224 | A1 * | 5/2007 | Ayers et al. ..................... | 705/32 |
| 2007/0174186 | A1 * | 7/2007 | Hokland ........................... | 705/39 |
| 2008/0033870 | A9 * | 2/2008 | Gutierrez-Sheris ............. | 705/39 |

OTHER PUBLICATIONS

"Teledata solutions automates wire transfer centers", Anonymous. America's Community Banker. Washington: Jul. 1996. vol. 5, Iss. 7; p. 43, 1 pgs-.*
"Teledata solutions automates wire transfer centers", America's Community Banker. Washington: Jul. 1996. vol. 5, Iss. 7; p. 43, 1 pgs.*

(Continued)

*Primary Examiner* — Ella Colbert
*Assistant Examiner* — Mohammad Z Shaikh
(74) *Attorney, Agent, or Firm* — Haynes and Boone, LLP

(57) ABSTRACT

Methods and systems for automatic verification and/or authorization of wire transfers by a telewire service provider are described. In one embodiment, a wire transfer agency database stores agency information including verified telephone numbers for each agency. When a wire transfer order is placed from a verified telephone number, automatic number identification transmitted with the telephone call is detected, the order is only allowed to be processed automatically if that telephone number in the database matches the calling agency, and the order receipt is successfully sent to that agency. Because the agency has been automatically associated with the order, the possibility of fraud and/or error is decreased, and the wire transfer can be automatically authorized after a delay time allowing the agency to issue changed instructions. Other embodiments are described and claimed.

30 Claims, 7 Drawing Sheets

OTHER PUBLICATIONS

"NEC America Enhances its CCInnovations Suite of Call Center Applications; Enhancement Additions to Product Line-Up Provide Improved Customer Care Solutions.", PR Newswire, Aug. 31, 1999, p. 8691.*

* cited by examiner

SECURE TELEWIRE PROCESS FOR AUTHORIZING WIRE TRANSFERS

BACKGROUND

The present disclosure relates to wire transfer methods and systems, and more particularly to methods and systems for automatic verification and/or authorization of a wire transfer.

Wire transfers remain a valuable method for transferring money across distance. Although several transaction models for accomplishing a wire transfer exist, in general all involve an agent receiving funds and wiring instructions from the sender. Although many agents now have access to sophisticated computer systems that allow the agent to initiate the transfer, a need remains for wire transfer agent systems that can initiate a transaction using traditional telephone networks and equipment.

In one system model, a wire transfer remote agency is equipped with a telephone and a facsimile (fax) machine. An agency client uses the telephone to call a central agency, where the client is connected with a customer service representative (CSR). The CSR creates an order and enters the sender's name, the agency's information, the intended recipient's name, and an agreed destination location. The CSR faxes a receipt to the agency from which the client called. Upon receipt of the fax, the agent collects the funds for the wire and delivers a copy of the receipt (or a portion of the receipt) to the client. The receipt may contain an alphanumeric key that will be required for the recipient to receive the funds at the destination location.

To complete the transaction, the agent faxes the remainder of or a copy of the receipt back to the central agency. Upon receipt, the central agency completes the order and authorizes the wire in the system. The agent can also cancel or modify a transaction by writing cancellation/modification instructions on the fax before sending it back, or the agent can call the central agent to cancel the transaction.

BRIEF DESCRIPTION OF THE DRAWINGS

FIGS. 5 and 6 contain screen displays for order status according to an embodiment.

FIGS. 7 and 8 contain screen displays for fax status according to an embodiment.

DETAILED DESCRIPTION

The aforementioned method for initiating and authorizing a wire transfer is burdened with several shortcomings. For instance, the potential exists for a person to call and fraudulently represent that they are at an agent's location, and then circumvent the faxing of the receipt by calling the central office to authorize the wire by impersonating the agent. Even without fraud, errors in the data entry process during order taking and authorization may cause receipts to be misrouted, lost, etc.

The prior method for telephone/fax-based wire transfers is also labor intensive and telecommunications intensive. The CSR must enter the agent's data for every order, and an authorization agent must review and authorize the return faxes. A busy remote agent may have little time to return faxes, and/or their fax machine may be busy receiving receipts, causing delays in the authorization process. Should a remote agent forget to return a fax or be delayed, the corresponding order will not close and an authorization agent must call the remote agent to get the unsent information.

Figure 1:
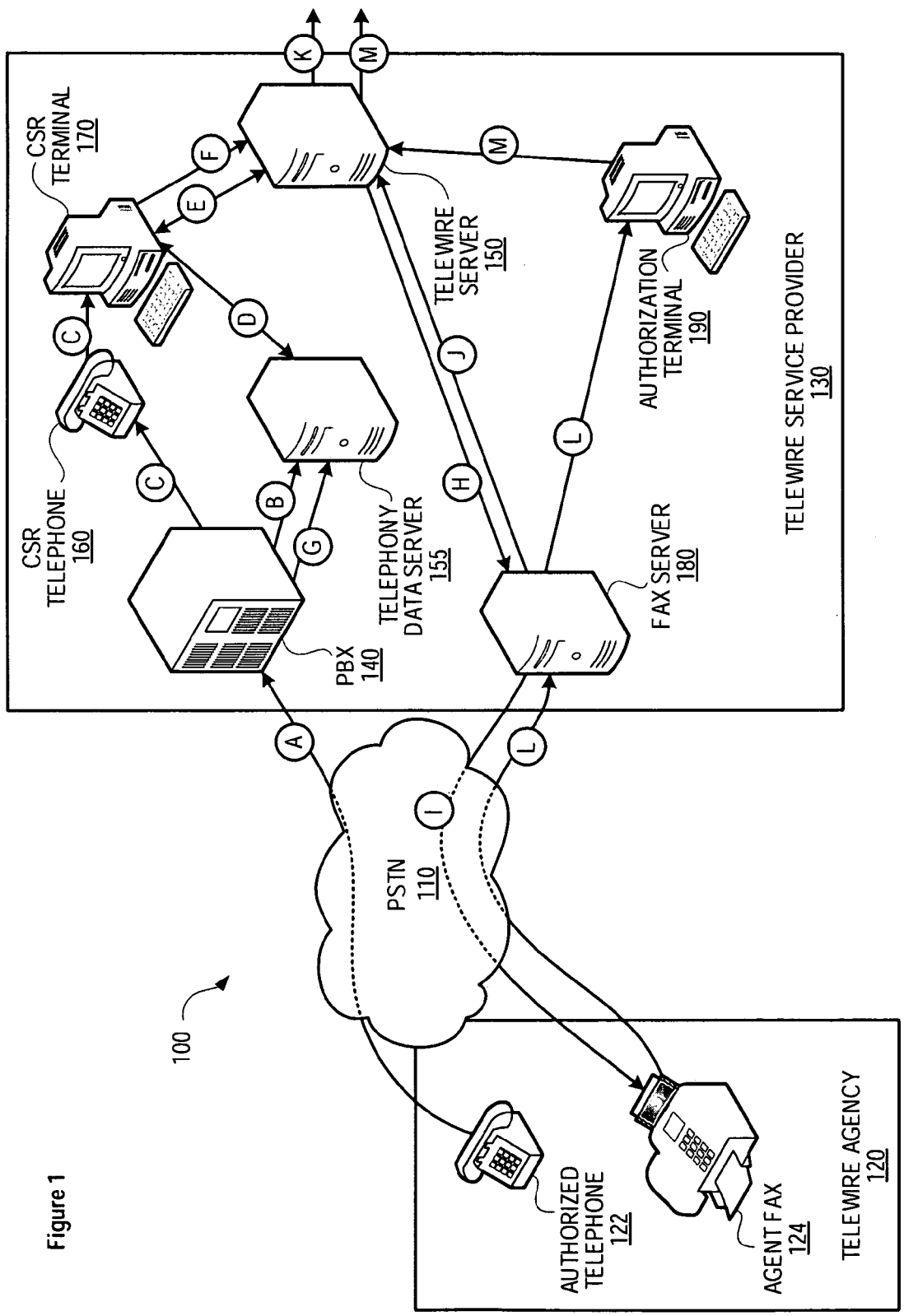
FIG. 1 illustrates the hardware components and connections of a system for providing wire by telephone (telewire) capability with automatic authorization.

The embodiments described herein can, at least in some circumstances, reduce or remove one or more of the disadvantages described above for telephone/fax-based wire transfers. FIG. 1 illustrates one such embodiment implemented within an overall telewire system 100. In FIG. 1, a telewire agency 120 and a telewire service provider 130 communicate across a Public Switched Telephone Network (PSTN) 110. Although the "switched" in PSTN 110 can apply to traditional circuit-switched connections, PSTN 110 is intended to also represent voice and fax calls that are transmitted across PSTN 110 in whole or in part using packet switching and packet-switching network elements.

The telewire agency 120 can in general be provisioned similar to a prior art telewire agency, e.g., with one or more telephones 122 and an agent fax machine 124. The telephone will generally be "authorized," however, by the telewire service provider 130, as will be explained shortly.

Figure 2:
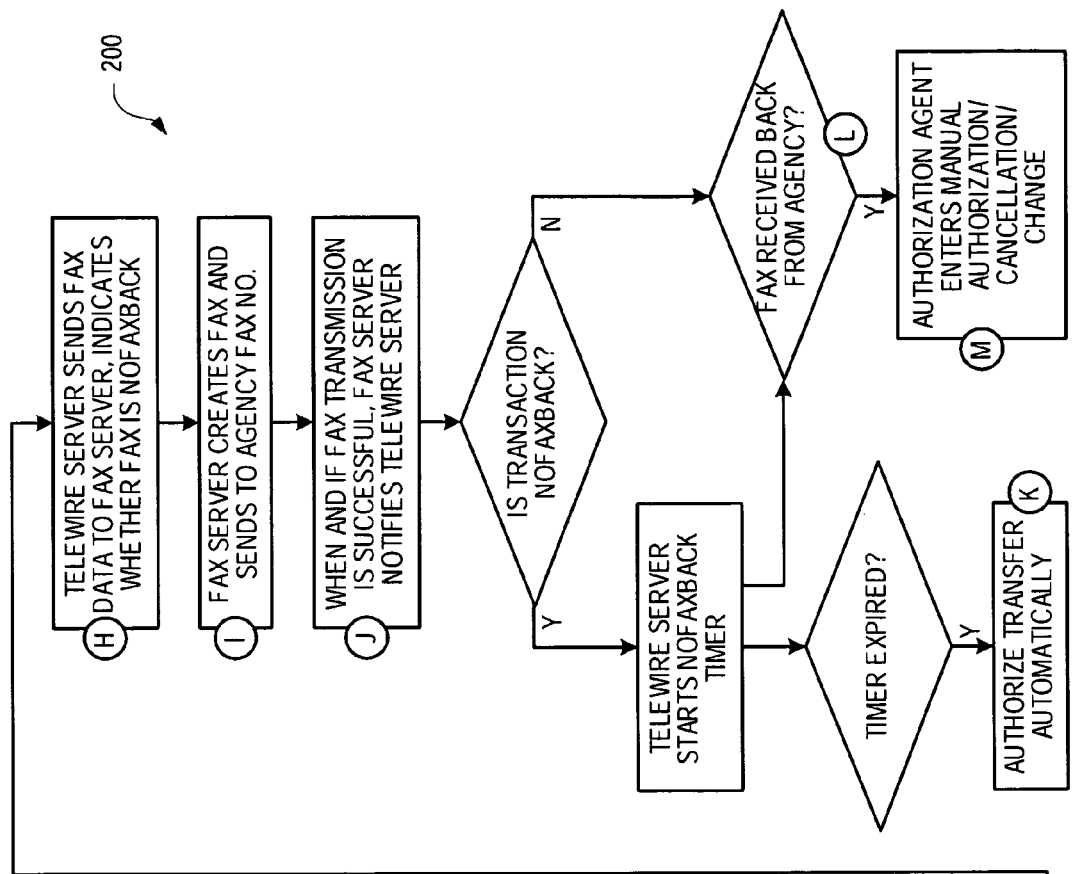
FIG. 2 contains a flowchart illustrating a method for creating and authorizing a telewire transaction using, e.g., the system of FIG. 1.
Figure 2:
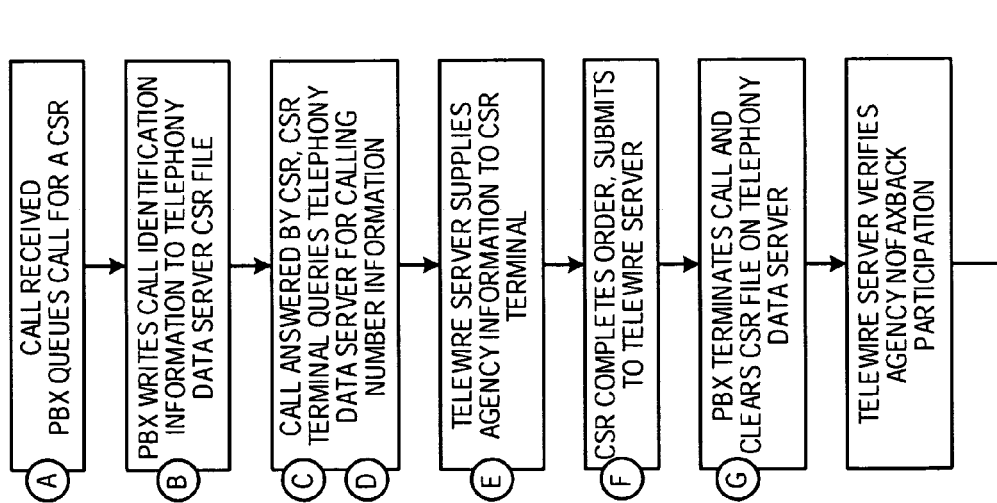

The telewire service provider 130 uses several cooperating systems to implement the telewire process. A private branch exchange (PBX) 140 receives calls on the service provider's 800 number that is pre-programmed into hard-wired phones at the telewire agencies. A telewire server 150 maintains databases for the authorized telewire agencies and wire orders, and communicates with the other computer systems used by telewire service provider 130. Each CSR receives the calls from the PBX on a CSR telephone 160, and inputs order information on a CSR terminal 170. A fax server 180 sends receipt faxes to the telewire agencies and receives return receipt authorization faxes back from those agencies. An authorization terminal 190 allows a service representative to review return receipts to approve wire transfers. During the wire transfer order/authorization process, these systems can communicate with each other using the lettered communications illustrated, as will be further described with reference to the flowchart 200 of FIG. 2.

An order transaction is initiated by a call A placed by a client on telephone 122 to telewire service provider 130. PBX 140 receives the call and queues it for a CSR.

Figure 3:
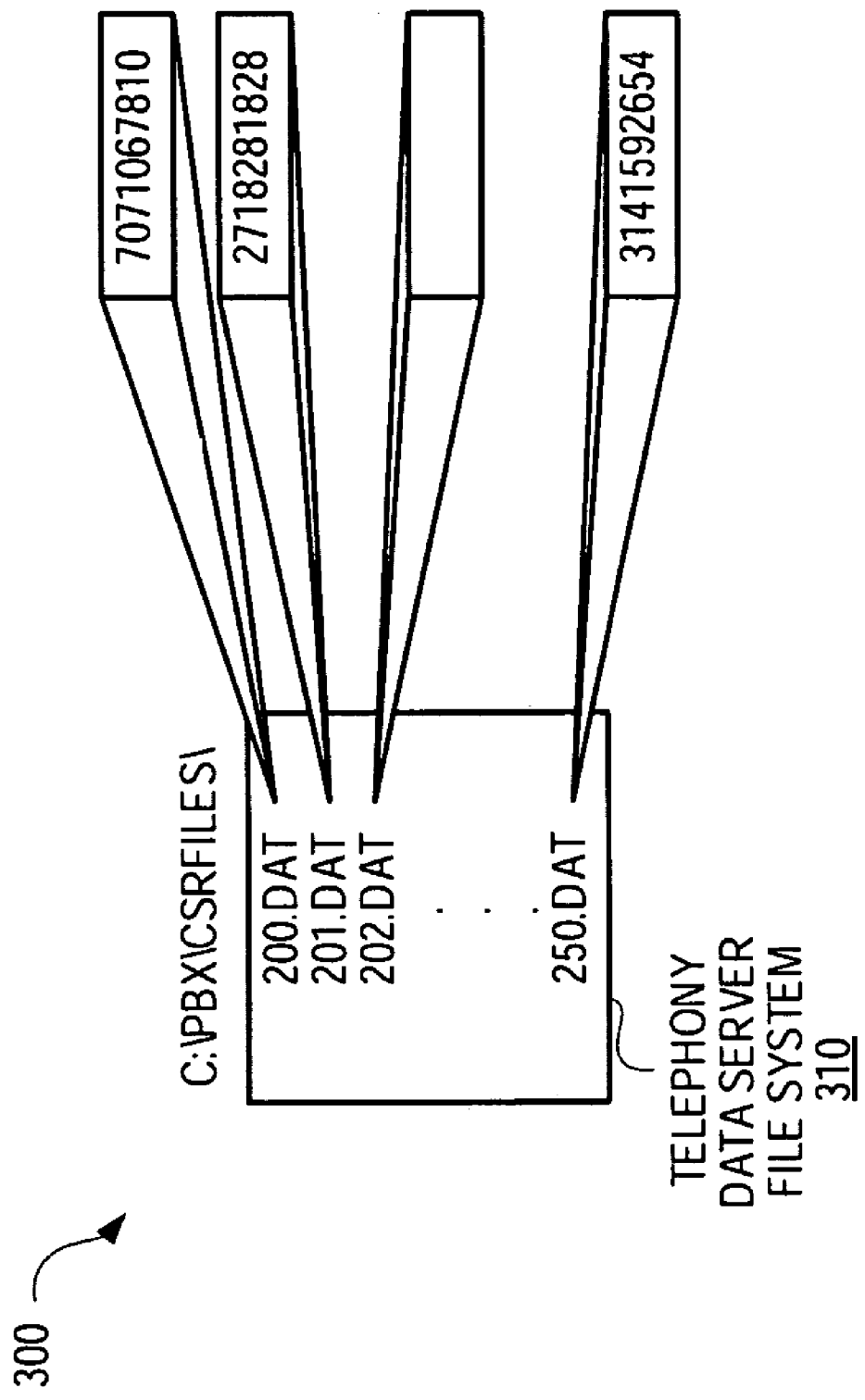
FIG. 3 shows a partial file system useful in an embodiment.

In transaction B, software captures the Automatic Number Identification (ANI) for the incoming call from PBX 140 and writes the number to a file on a Telephony Data server 155 file system 310. Referring to FIG. 3, in one embodiment a file system 310 directory 300 (e.g., C:\PBX\CSRFILES\) contains one file for each CSR telephone extension. In the example, valid CSR extensions are 200 through 250, and thus directory 300 contains corresponding files 200.DAT to 250.DAT. Each file contains the ANI for the call currently queued for or connected to the CSR extension (as shown for files 200.DAT, 201.DAT, and 250.DAT), or is blank when no call is currently queued for or connected to the CSR extension (as shown for file 202.DAT).

In transaction C, the CSR at telephone 160 picks up the call directed to that extension by PBX 140. When the client on the call requests a new wire transfer, the CSR opens a new order screen. When the new order screen is opened, CSR terminal 170 opens (transaction D) the file corresponding to the CSR on Telephony Data server 155 to retrieve the ANI file for that CSR. For instance, if the CSR extension was 250, CSR terminal 170 would open the file C:\PBX\CSRFILES\250.DAT on Telephone Data server 155 for reading. Telephony Data server 155 returns the contents of the ANI file ("3141592654") to the new order application on CSR terminal 170.

In transaction E, the new order application searches the agency database information on telewire server 150 using the ANI number, identifies the appropriate agency, and determines participation in the automated authorization process. The telewire server 150 returns the agent information (when successfully located) from the agent information database to the CSR terminal 170. CSR terminal 170 uses the returned information to automatically fill in fields in the order screen and/or prompt the CSR to manually request the information.

When an order screen has been completed, the CSR submits the wire transfer order F to telewire server 150, which then adds the wire transfer order to a wire transfer order database. When the CSR hangs up, the PBX terminates the call and software clears the contents of the ANI file on Telephony Data server 155 as transaction G.

Once the CSR has finalized the wire transfer order, telewire server 150 begins order processing. Based on the agent information saved with the wire transfer order, telewire server 150 determines the telephone number for agent fax 124 from the agent information database. Telewire server 150 then initiates a transaction H to fax server 180, sending the fax data to fax server 180. This data includes data to be printed on a fax receipt, including the agent number, wire number, control number, agent telephone number and fax number, sender and recipient numbers, amount of money to be transferred, and a Personal Identification Number to be used by the recipient when claiming the funds. The fax data also includes the type of fax—traditional or "NoFAXBack." As will be explained below in further detail, a NoFAXBack wire transfer order receipt indicates that the telewire service provider 130 will automatically authorize the wire transfer, based on the ANI-verified order placement and successful transmission of the fax receipt to the agency, absent any response from the agency.

Fax server 180 dials the number supplied for agent fax 124. When successful in establishing a connection with agent fax 124, fax server 180 sends agent fax 124 a fax transmission I, including the fax data and an indication as to whether the wire transfer order receipt is a NoFAXBack type receipt or not.

Upon successful transmission of the fax, fax server 180 sends a notification J to telewire server 150 that the wire transfer order receipt was successfully transmitted to telewire agency 120. Telewire server 150 updates the status of the wire transfer order in its wire transfer order database.

When the wire transfer order is a NoFAXBack order, telewire server 150 starts a NoFAXBack timer for the order, e.g., allowing a selected time such as 60 minutes before the wire transfer will be authorized automatically (preferably, the wire transfer order receipt indicates to the agent and client the delay or approximate time of automatic authorization for the order). Should the timer expire with no further action taken on the order, telewire server 150 automatically authorizes the wire transfer and sends paying instructions K to the wire transfer destination agent.

When the wire transfer order is not a NoFAXBack order, the wire transfer will not be authorized without some affirmative action from the agent. For instance, the agent can send a return copy of the receipt fax, or a portion thereof, back to fax server 180 (transaction L), annotated as to whether the wire transfer order was canceled, modified, or paid for. Fax server 180 forwards an image of the return fax to an authorization terminal 190 for review by an authorization agent. The authorization agent reviews the return fax, determines the wire number, and cancels, modifies, or authorizes the corresponding wire transfer according to the indication on the return fax. The authorization agent executes a transaction M from authorization terminal 190 to telewire server 150, causing the telewire server to send paying instructions to the wire transfer destination agent, or cancel the order, according to the return fax.

To further secure the manual authorization procedure, fax server 180 (or PBX 140, if it receives incoming fax calls and directs them to fax server 180) can detect ANI information for the incoming fax and forward that information along with the fax image to authorization terminal 190. When the authorization agent reads the wire number and enters it in authorization terminal 190, the authorization terminal retrieves information from the telewire server, including the outgoing fax number to which the wire transfer order receipt was sent. The outgoing fax number is compared to the incoming fax number. When the two numbers do not match, the authorization agent is prevented from authorizing the wire transfer and prompted to call the agent directly at the agent's authorized phone number.

In a NoFAXBack transaction the telewire agency 120 may also decide to send a return copy of the receipt fax. For instance, the client may cancel or modify the order, or may want the order expedited. In a case of fraud or error, the agency may review the receipt fax and send it back with authorization denied, prior to the expiration of the NoFAXBack authorization period. In such cases, an authorization agent reviews the incoming fax in a process similar to that provided for manual authorization faxes, and overrides the NoFAXBack authorization procedure.

Telewire agency 120 may also manually authorize a wire transfer order as a voice transaction, by calling an authorization number at the telewire service provider 130. In such a case, PBX 140 can queue the call for an authorization terminal in similar fashion to the procedure described for incoming orders, with ANI used to verify the agent. Other verification safeguards can also be employed to prevent fraud with voice-authorized wire transfers.

Figure 4:
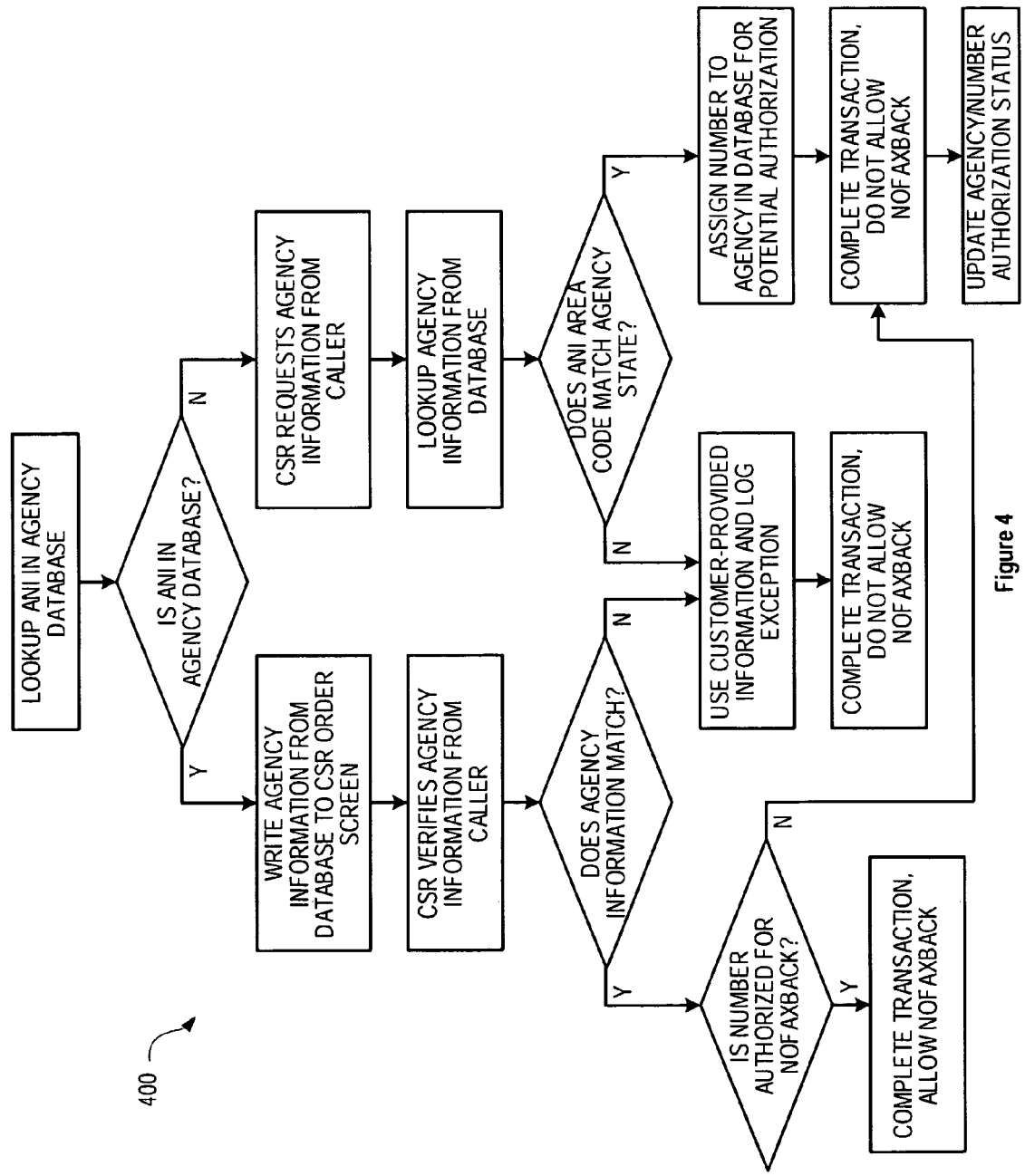
FIG. 4 contains a flow chart for verification of agency information for an order.

FIG. 4 contains a flowchart 400, showing more details for an embodiment using ANI during the wire transfer order process. When the CSR terminal 170 (FIG. 1) begins a new wire and requests the ANI for the current call, the ANI is looked up in the agency database. When the calling station exists in the agency database, agency information from the database is automatically inserted into the CSR order screen. For instance, the agent calling number, agent identification number, agent name, agent address, etc., can be filled into corresponding fields automatically in an order screen on the CSR terminal. The CSR is prompted to verify the agency number, and will enter the customer-provided agency number manually if not the same as the agency number retrieved in the automated system. If a match was not achieved, the CSR will override the system entering the agency information manually and log the exception for further review. The transaction is performed in Normal Mode requiring authentication from the agency.

When the CSR has entered information for the order, with verification of the agent matched to the ANI, the system determines whether the wire transfer order is eligible for NoFAXBack processing. Individual agents can elect whether or not to allow NoFAXBack orders to be placed from one of their offices. The system determines whether the individual agent has so elected, and whether the calling number has been verified as associated with the agent. If both of these conditions are true, the order will be processed as a NoFAXBack order. Otherwise, the order will be processed as a traditional, manual verification order.

Returning to the top of flowchart 400, a call may be received for several reasons with an ANI that is not in the agency database. For instance, the agency may have a new number that they have neglected to register with the telewire service provider, a client may misunderstand the requirement for a call from an agency phone, or someone may be attempting a fraudulent transfer. Whatever the case, the CSR is prompted to obtain agency information from the caller and enter that information in an agency query window. ANIs that do not match the agency database are logged to determine whether they should be added to the database as new agency information. A screening process including matching the area code to the corresponding state for the agency is performed. The number is accepted or rejected based on the result.

Assuming that the state from which the call originated matches the agency's state as it appears in the agency database, the CSR is allowed to enter the order, and a database entry is created for the ANI. The number is assigned to the agency indicated by the caller, pending authorization. The order is required to have manual authorization by the agent, with NoFAXBack disallowed.

A database process allows pending agency numbers to become authorized agency numbers. For instance, after each order is manually authorized, the database is revisited to examine whether the order was placed from a pending agency number. If so, status for the agency number can be tracked, such as a minimum number of successful orders received from the number from different clients over a minimum time frame. When the new successful order allows these minimums to be met, the agency number is changed from pending to automatically authorized, allowing NoFAXBack transactions to be initiated from the number when the agency allows such transactions.

Figures 5, 6:
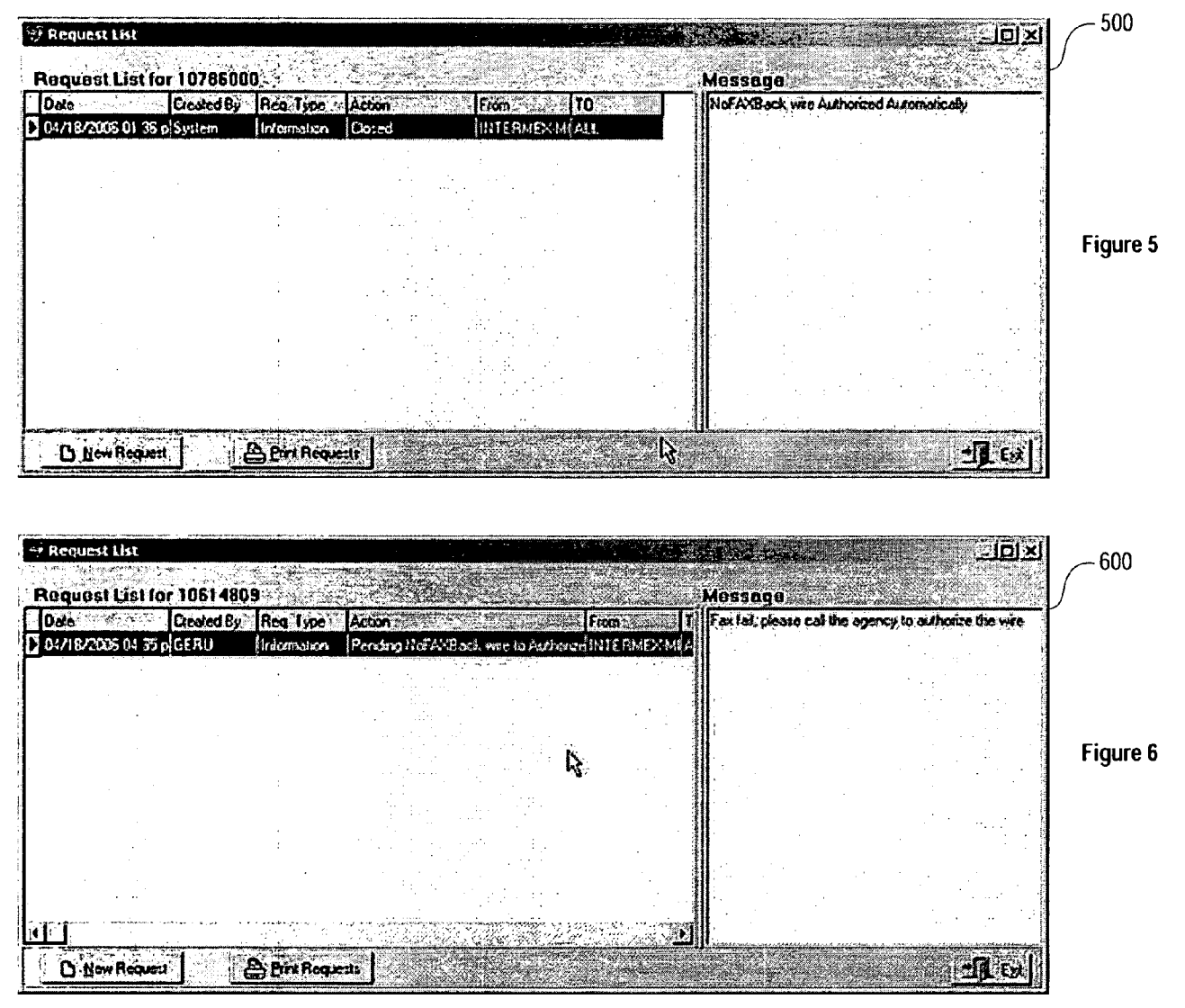

Authorization agents and other authorized telewire service provider personnel can query the database to determine NoFAXBack status for an order. FIGS. 5 and 6 show order status windows 500 and 600, respectively, for two orders entered into the database in a telewire server. Window 500 shows that a first queried order is closed, with an explanatory message "NoFAXBack wire Authorized Automatically," indicating the successful automatic authorization of the wire. Window 600 shows that a second queried order is a pending NoFAXBack wire, with an explanatory message "Fax fail, please call the agency to authorize the wire." The explanatory message in this case indicates that the fax server was unsuccessful in sending a NoFAXBack order receipt to the agent, and manual authorization initiated by the service provider will be necessary. The state of all orders in the system, NoFAXBack and otherwise, can be queried in similar manner.

Figures 7, 8:
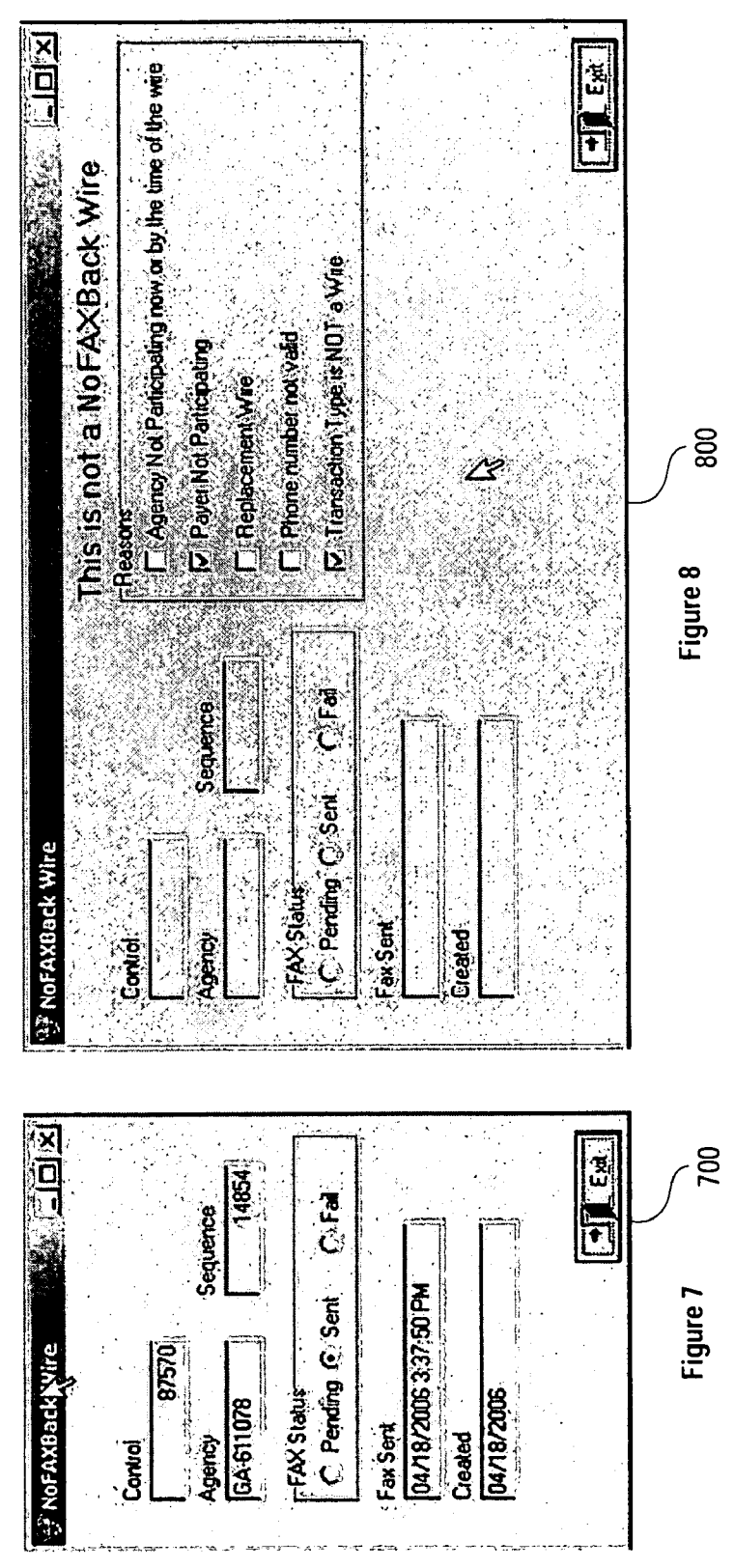

Telewire service provider personnel can also check the NoFAXBack status of pending wires in the system by selecting the wire from a list and requesting an action to display NoFAXBack status for the wire. In one embodiment, the pending wires are presented, one per row, in a scrollable window on a computer display. The user points a cursor at a particular wire, right-clicks the mouse or other pointing device to see options, and selects an option for "NoFAXBack Wire." The wire transfer order database is queried, and a popup window displays NoFAXBack status for the selected wire. Two exemplary popup windows 700 and 800 are illustrated, respectively, in FIGS. 7 and 8. Window 700 shows status information for a NoFAXBack wire that was successfully sent, and is now in a waiting period prior to the wire being automatically authorized. Window 800 shows status information for a wire that is not a NoFAXBack wire. The popup window expands with a reason list, showing possible reasons why the wire was not processed as a NoFAXBack wire. The reason(s) that cause the wire to not be processed as a NoFAXBack wire are checked in the list.

Figure 9:
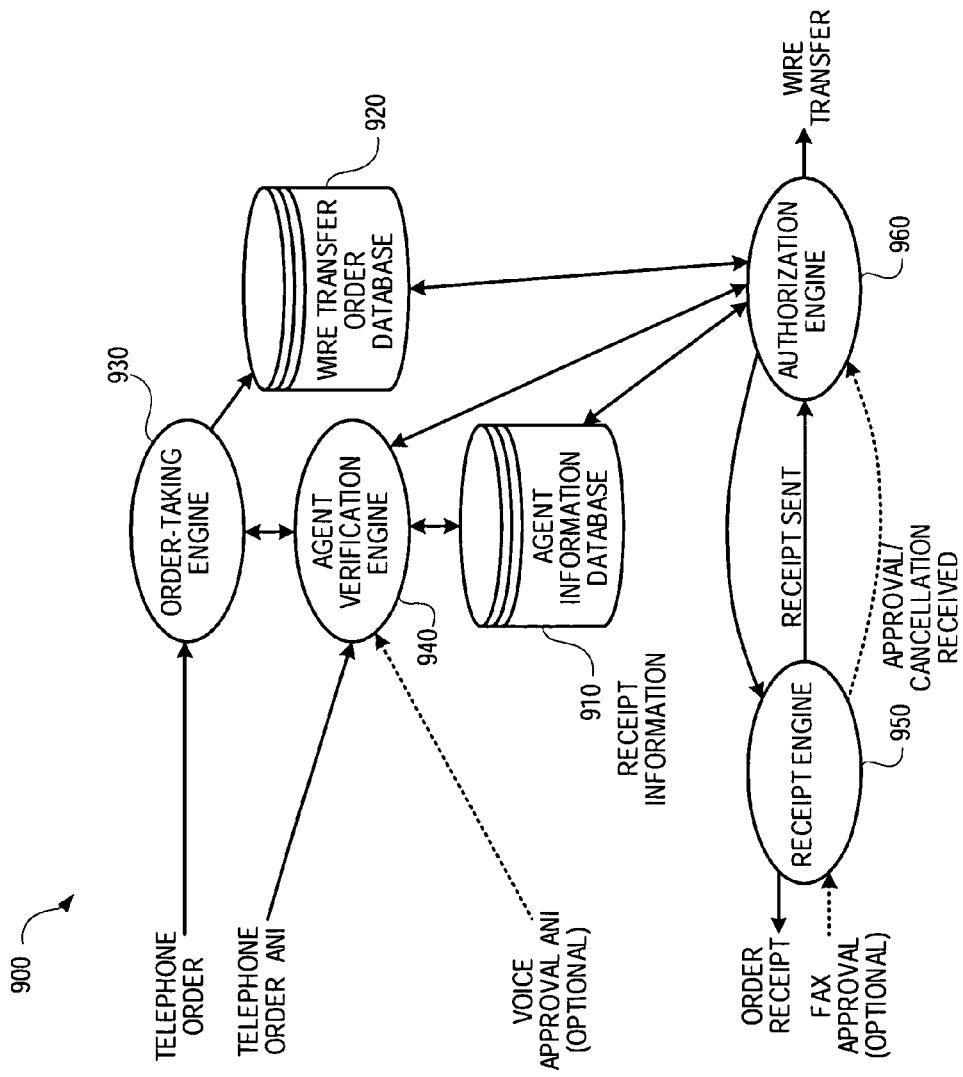
FIG. 9 shows the primary functional blocks and communication paths of a telewire system according to an embodiment.

Although the previous embodiments show a specific telewire service provider system with specific computer components, a variety of computer configurations are possible. FIG. 9 shows a functional block diagram 900 for an embodiment that could be embodied in many different computer configurations. An agent information database 910 stores authorized agency information, including an authorized fax number (or other format receipt address) and at least one authorized telephone number. More than one authorized telephone number can exist for a given agency, including numbers added through the pending-to-authorized automated process described in conjunction with FIG. 4 above.

A wire transfer order database 920 stores entered, pending orders, and optionally, completed orders.

An order-taking engine 930 receives telephone orders, using e.g., a customer service representative, voice recognition technology, and/or telephone keypad entry to obtain order information from a client. The order-taking engine 930 stores the entered orders to the wire transfer order database.

Order-taking engine 930 also communicates with an agent verification engine 940. Agent verification engine 940 receives telephone ANI information for each telephone order received by the order-taking engine 930. Agent verification engine 940 uses the telephone ANI information to attempt a match and retrieve agent information from agent information database 910. Agent verification engine 940 cooperates with order-taking engine 930 to verify information provided by the client and/or prompt the client to supply certain information, based on the results of the agent information database search.

Once an order is entered and stored to wire transfer order database 920, an authorization engine 960 processes the wire. The order is read from the database by the authorization engine, and receipt information is compiled from the order and from agent information retrieved for the order from the agent information database 910.

The receipt information is transmitted by authorization engine 960 to a receipt engine 950. Receipt engine 950 generates an order receipt for each wire transfer order, and electronically forwards the order receipt to an agent receipt address stored with the agent information. The order receipt can be sent, as previously described, as a facsimile to a facsimile telephone number. In another embodiment, the agent receipt address is an e-mail address, and the receipt is sent to the address in a printable format such as the Portable Document Format (PDF), developed by Adobe Systems Incorporated. In yet another embodiment, the agent receipt address is a printer address, e.g., for a printer connected by a secure network tunnel to the telewire service provider, and the order receipt is sent to the printer as a print job. The secure network tunnel could be maintained continually, or could be established by the receipt engine when it is to send an order receipt, and then taken down afterwards.

Once the receipt engine has sent the order receipt, it notifies authorization engine 960 that the receipt is at the agency. The authorization engine can then start a NoFAXBack timer, if appropriate, for the order. In other cases, the authorization engine can start a response needed timer that, if the timer expires with no authorization received, prompts a representative to contact the agency to receive manual authorization.

As explained previously, for NoFAXBack orders an optional approval (change/cancellation) can be received, e.g., by receipt engine 950. When an optional response is received, the receipt engine notifies the authorization engine 960 of the response. The response could also be a telephone call. In either case, ANI transmitted with the response is sent to the authorization engine 960 to aid verification of the authorization response.

Those skilled in the art will appreciate that the databases shown in FIG. 9 can be implemented and managed using well-known database techniques and tools. For instance, the order-taking engine, agent verification engine, and authorization engine can interact with databases 910 and 920 using Structured Query Language (SQL) transactions.

Engines 930, 940, 950, and 960 can be implemented in a common software process, in multiple processes executing on a common computer system, or multiple processes distributed across several computer systems.

Although several illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A wire transfer system comprising:
an agent information database; a wire transfer order database; an order-taking engine to receive data directly from a wire transfer client who is not an agent for a new telephone order into the wire transfer order database; the order taking engine comprising at least one computer system; an agent verification engine that captures automatic number identification for the calling station of the telephone order, attempts to match the automatic number identification to an agent calling station in the agent information database, and, when a match occurs, automatically supplies agent information from the database to the order-taking engine; a receipt engine to generate an order receipt for the wire transfer order and electronically forward the order receipt to an agent receipt address stored with the agent information, the receipt engine generating an indication when the order receipt has been successfully forwarded to the agent receipt address; and an authorization engine to, when the agent has been verified by the agent verification engine, automatically authorize the wire transfer at a selected time after the indication that the order receipt was successfully forwarded.

2. The wire transfer system of claim 1, the agent information database maintaining status indicating whether wire transfer orders from the agent are allowed to be automatically authorized when the agent has been verified by the agent verification engine.

3. The wire transfer system of claim 1, wherein the wire transfer order database indicates for the telephone order, when the agent is verified and wire transfer orders from the agent are allowed to be automatically authorized, that the wire transfer order is allowed to be automatically authorized.

4. The wire transfer system of claim 3, the authorization engine automatically authorizing the wire transfer at the selected time when the automatic authorization is allowed for the wire transfer order in the wire transfer order database.

5. The wire transfer system of claim 3, wherein the receipt engine indicates on the generated order receipt whether automatic authorization is allowed based on whether automatic authorization is allowed for the wire transfer order in the wire transfer order database.

6. The wire transfer system of claim 1, further comprising an automatic agent update engine that updates the agent information database based on the automatic number identification when the order-taking engine receives dam for a telephone order from an unverified agent calling station but a valid agent.

7. The wire transfer system of claim 6, wherein the telephone order is not allowed to be automatically authorized when the automatic number identification indicates that the unverified agent calling station is associated with a telephonic area code associated with a different state than that of the valid agent.

8. The wire transfer system of claim 6, the automatic agent update engine verifying an unverified agent calling station as associated with the agent after a selected number of successful wire transfer orders, from different clients, are received from the agent calling station.

9. The wire transfer system of claim 1, wherein the order receipt comprises a facsimile, and electronic forwarding of the order receipt comprises facsimile transmission to an agent facsimile telephone number.

10. The wire transfer system of claim 9, wherein the receipt engine is a facsimile server that is also capable of receiving return facsimile receipts from an agent, and wherein the authorization engine compares the agent facsimile telephone number to which an order receipt is transmitted to an automatic number identification of a corresponding return facsimile receipt to facilitate authorization of a wire order.

11. The wire transfer system of claim 1, wherein telephone authorization of a wire transfer order is allowed, the authorization engine comparing an automatic number identification for the agent calling station from which the telephone authorization is being attempted to the verified agent calling stations in the agent information database to facilitate authorization of a wire order.

12. The wire transfer system of claim 1, wherein the agent information database, wire transfer order database, agent verification engine, and authorization engine reside on a common server system.

13. The wire transfer system of claim 1, further comprising a private branch exchange in communication with a plurality of order-taking stations, each comprising an operator calling station and an order-taking engine endpoint, wherein the private branch exchange queues incoming telephone orders for the order-taking stations, and associates automatic number identification for each incoming telephone order with the order-taking station assigned to that incoming telephone order.

14. The wire transfer system of claim 13, wherein the private branch exchange associates the automatic number identification for the incoming telephone order with the order-taking station assigned to that order by writing the automatic number identification to a selected file on a file server, wherein the selected file has a filename associated with the assigned order-taking station.

15. The wire transfer station of claim 14, wherein the private branch initiates an erasure process for the automatic number identification from the selected file when the incoming telephone order call is terminated.

16. A method of processing telephone wire transfer orders, the method comprising: receiving a new telephone order from a wire transfer client, other than an agent, located at a calling station, and an automatic number identification for the calling station; receiving data for the telephone order into a wire transfer order database; attempting to match using at least one server, the automatic number identification for the calling station with an agent calling station in an agent information database; when the automatic number identification for the calling station matches a verified agent calling station in the agent information database, and the agent information database indicates that automatic authorization of wire orders for the agent calling station is allowed, marking the telephone order data in the wire transfer order database accordingly; generating and electronically forwarding an order receipt for a wire transfer to the agent associated with the telephone order; generating a notification when the order receipt has been successfully forwarded to the agent associated with the telephone order; and for a wire transfer associated with an agent calling station for which automatic authorization is allowed, automatically authorizing the wire transfer at a selected time after the notification is generated.

17. The method of claim 16, wherein when the automatic number identification for the calling station matches an agent calling station in the agent information database, supplying agent information from the agent information database to an operator handling the telephone order.

18. The method of claim 17, wherein when the automatic number identification for the calling station does not match an agent calling station in the agent information database, retrieving agent information from the agent information database for a manually supplied agent identifier, and comparing the state indicated in the agent address information with the state associated with the automatic number identification of the calling station.

19. The method of claim 18, further comprising disallowing automatic authorization of the telephone order when the state indicated in the agent address information does not match the state associated with the automatic number identification of the calling station.

20. The method of claim 18, further comprising, when the state indicated in the agent address information matches the state associated with the automatic number identification of the calling station, assigned the automatic number identification to the agent information in the database, marked as pending authorization.

21. The method of claim 16, wherein the agent information database saves unverified calling station numbers and associated agency information in the agent information database for calling stations when a wire transfer order is received from a calling station that does not already exist in the agent information database.

22. The method of claim 21, further comprising changing the state of an unverified calling station number in the agent information database to verified after a selected number of successful wire transfer orders, from different clients, are received from the agent calling station.

23. The method of claim 22, further comprising, when changing the state of an unverified calling station number to verified and automatic authorization of wire orders is permitted for other calling station numbers associated with the same agency in the agent information database, indicating that automatic authorization of wire orders for the calling station number is allowed.

24. The method of claim 16, further comprising rejecting a telephone order when a caller indicates that they are calling from an agency other than the agency associated with the automatic number identification in the agent information database.

25. The method of claim 16, wherein the order receipt comprises a facsimile, and electronic forwarding of the order receipt comprises facsimile transmission to an agent facsimile telephone number.

26. The method of claim 24, further comprising receiving a return facsimile receipt from the agent for the wire transfer, and an associated return facsimile automatic number identification, and comparing the agent facsimile telephone number to which the order receipt was transmitted to the automatic number identification of the return facsimile receipt to facilitate authorization of a wire order.

27. The method of claim 16, wherein telephone authorization of a wire transfer order is allowed, the method further comprising comparing an automatic number identification for the agent calling station from which the telephone authorization is being attempted to the verified agent calling stations in the agent information database to facilitate authorization of a wire order.

28. The method of claim 16, further comprising queuing the telephone order for a selected order-taking station in a plurality of such stations, and associating the automatic number identification for the telephone with the selected order-taking station.

29. The method of claim 28, wherein associating the automatic number identification for the telephone order with the order-taking station selected for that order comprises writing the automatic number identification to a selected file on a file server, wherein the selected file has a filename associated with the selected order-taking station.

30. The method of claim 29, further comprising erasing the automatic number identification from the selected file when the telephone order call is terminated.

* * * * *

UNITED STATES PATENT AND TRADEMARK OFFICE
CERTIFICATE OF CORRECTION

| | | |
|---|---|---|
| PATENT NO. | : 7,983,970 B1 | Page 1 of 1 |
| APPLICATION NO. | : 11/438574 | |
| DATED | : July 19, 2011 | |
| INVENTOR(S) | : Randall S. Ostler et al. | |

It is certified that error appears in the above-identified patent and that said Letters Patent is hereby corrected as shown below:

Column 3, Line 40, change "AN I-verified" to -- ANI-verified --

Column 8, Claim 6, Line 9, change "dam" to -- data --

Signed and Sealed this
Thirtieth Day of August, 2011

David J. Kappos
*Director of the United States Patent and Trademark Office*